(12) United States Patent
Kirchner et al.

(10) Patent No.: US 8,715,835 B2
(45) Date of Patent: May 6, 2014

(54) TOLERANCE STRIPS

(75) Inventors: Christian Kirchner, Dortmund (DE); Jingjing Luo, Slough (GB)

(73) Assignee: John Crane UK Limited, Slough (GB)

( * ) Notice: Subject to any disclaimer, the term of this patent is extended or adjusted under 35 U.S.C. 154(b) by 277 days.

(21) Appl. No.: 13/202,514

(22) PCT Filed: Feb. 23, 2010

(86) PCT No.: PCT/GB2010/000315
§ 371 (c)(1), (2), (4) Date: Aug. 19, 2011

(87) PCT Pub. No.: WO2010/097574
PCT Pub. Date: Sep. 2, 2010

(65) Prior Publication Data
US 2011/0300399 A1    Dec. 8, 2011

(30) Foreign Application Priority Data
Feb. 26, 2009   (GB) .................................. 0903290.5

(51) Int. Cl.
*B21D 13/08*    (2006.01)
*B21D 13/00*    (2006.01)
*F16J 15/08*    (2006.01)
*F16J 15/22*    (2006.01)
*F16J 15/34*    (2006.01)
*F16J 15/02*    (2006.01)

(52) U.S. Cl.
CPC ................ *B21D 13/08* (2013.01); *B21D 13/00* (2013.01); *F16J 15/22* (2013.01); *F16J 15/022* (2013.01); *F16J 15/08* (2013.01); *F16J 15/3428* (2013.01)

USPC .......... 428/603; 428/182; 428/183; 277/644; 277/648; 277/650; 72/379.6

(58) Field of Classification Search
None
See application file for complete search history.

(56) References Cited

U.S. PATENT DOCUMENTS

| 1,681,819 | A | * | 8/1928 | Small | 52/86 |
| 1,748,772 | A | * | 2/1930 | Hunker | 72/368 |
| 1,996,004 | A | * | 3/1935 | Fraser | 52/630 |

(Continued)

FOREIGN PATENT DOCUMENTS

| AT | 174257 | 3/1953 |
| DE | 3428744 | 2/1985 |

(Continued)

OTHER PUBLICATIONS

European Patent Office, International Search Report in International Patent Application No. PCT/GB2010/000315 (Jun. 24, 2010).

(Continued)

*Primary Examiner* — John J Zimmerman
(74) *Attorney, Agent, or Firm* — Leydig, Voit & Mayer, Ltd.

(57) ABSTRACT

A tolerance strip is formed a strip of resilient material with corrugations, the corrugations extending transversely across the full width of the strip, the corrugations defining crests with troughs between adjacent corrugations, a central portion of the corrugations being of substantially uniform height across the strip, portions of the corrugations adjacent each longitudinal edge of the strip decreasing in height towards the edge of the strip. In one form the corrugations are flat longitudinally of the strip at the crests and/or troughs.

10 Claims, 2 Drawing Sheets

(56) References Cited

U.S. PATENT DOCUMENTS

| | | | | |
|---|---|---|---|---|
| 2,059,292 | A | * | 11/1936 | Taylor ............... 72/379.6 |
| 2,169,025 | A | * | 8/1939 | Forbes ............... 29/592.1 |
| 2,196,582 | A | * | 4/1940 | Armstrong ............ 277/612 |
| 2,217,110 | A | * | 10/1940 | Gilpin ............. 52/783.11 |
| 2,262,086 | A | * | 11/1941 | Barrow ............... 72/196 |
| 2,636,968 | A | * | 4/1953 | Watter ............... 219/83 |
| 2,833,031 | A | * | 5/1958 | Flumerfelt ........... 72/378 |
| 3,119,446 | A | * | 1/1964 | Gerhart .............. 165/170 |
| 3,372,963 | A | | 3/1968 | Harris |
| 3,633,398 | A | | 1/1972 | Koch |
| 3,961,799 | A | | 6/1976 | Peet |
| 4,165,081 | A | | 8/1979 | Geppert |
| 4,241,664 | A | * | 12/1980 | Cable ................ 104/118 |
| 4,274,683 | A | | 6/1981 | Gray |
| 4,286,894 | A | * | 9/1981 | Rongley .............. 403/372 |
| 4,762,743 | A | * | 8/1988 | von Alven et al. ..... 428/156 |
| 5,388,843 | A | | 2/1995 | Sedy |
| 5,501,912 | A | * | 3/1996 | Sergenius ............ 428/604 |
| 5,533,739 | A | | 7/1996 | Sedy |
| 6,314,664 | B1 | | 11/2001 | Kita |
| 7,704,292 | B2 | * | 4/2010 | Hu ................... 55/385.3 |
| 7,913,835 | B2 | * | 3/2011 | Gautier et al. ....... 198/780 |
| 2007/0187961 | A1 | * | 8/2007 | Audi et al. .......... 293/134 |
| 2008/0062572 | A1 | | 3/2008 | Hanrahan et al. |

FOREIGN PATENT DOCUMENTS

| | | | |
|---|---|---|---|
| EP | 0438346 | | 7/1991 |
| EP | 1083349 | | 3/2001 |
| EP | 1319874 | | 6/2003 |
| GB | 1516777 | * | 7/1978 |
| SU | 1609963 | * | 11/1990 |

OTHER PUBLICATIONS

European Patent Office, Written Opinion in International Patent Application No. PCT/GB2010/000315 (Jun. 24, 2010).
GB Search Report in GB0303290.5 (May 28, 2009).

* cited by examiner

TOLERANCE STRIPS

The present invention relates to tolerance strips and in particular tolerance strips which may be mounted between components to maintain spacing between the components while allowing variation in the spacing to accommodate differential thermal expansion. Such tolerance strips are typically used for the mounting of concentric components, for example on mechanical seals to centre one component with respect to another, while accommodating tolerance variations in the diameters of the components as well as variations in those dimensions due to thermal expansion.

Hitherto, tolerance strips have been formed from resilient metal strip in which a series of transversely orientated projections are pressed to one side of the strip, the projections having inclined transverse and end walls, said end walls being spaced inwardly from the edges of the strip, the edges of the strip being coplanar with portions of strip between the projections, to form a continuous bearing surface. The crests of the projections are rounded or pointed. The projections are formed by pressing the strip between rollers, so that the material undergoes plastic deformation. As a result, the material becomes work hardened and rigid. As a consequence the tolerance strip is not resilient. If consequently the tolerance strip is compressed due to differential thermal expansion of the components between which it is fitted, when the gap between the components increases as the temperature lowers, the tolerance strip will remain compressed and would not return to its original state and the fill the gap between the components.

Moreover due to the high rigidity and lack of compliance of the tolerance strip, the components will be highly loaded as the components expand towards one another with potential damage to the components, particularly where the components are made of brittle material, for example ceramic materials. This problem is exacerbated by the shape of the crests of the projections which make line contact with the component on that side of the tolerance strip.

The tolerance strip used hitherto is not consequently suitable for high temperature applications, particularly where one or both of the components are made of brittle material.

A further disadvantage of the known tolerance strip is that as the strip is pressed, the material yields and causes the areas around the projections to contract causing width of the strip to narrow. The pressure applied by the rollers must consequently be accurately controlled in order to ensure that the manufacturing tolerances of the finished strip are acceptable. Even with accurate control of the pressing process, the scrap rate is high.

According to one aspect of the present invention a tolerance strip comprises a strip of resilient material formed with corrugations, the corrugations extending transversely across the full width of the strip, the corrugations defining crests with troughs between adjacent corrugations, a central portion of the corrugations being of substantially uniform height across the strip, portions of the corrugations adjacent each longitudinal edge of the strip decreasing in height towards the edge of the strip.

While the corrugations of the present invention may be formed in similar manner to the projections of the prior art, the corrugations do not yield as much and consequently there is far less work hardening and the corrugated strip retains much more of the resilience of the material. Moreover, the corrugations will only engage the components between which they act along the troughs and crests of the corrugations. Unlike the prior art, the tapered portions of the strip are also used to control the amount of compliance in the strip.

Accordingly, the tolerance strip of the present invention will consequently be far more resilient than the tolerance strips of the prior art and will impose lower loads on the components with which they are used. Moreover as the corrugations do not yield as much there will be less contraction of the material around the corrugations and, control of the dimensions of the strip to manufacturing tolerances will be easier, with less likely hood of scrap.

Because the tolerance strips are generally manufactured by the pressing process, the material will yield. However, the tolerance strip of the present invention does not yield as much in comparison to the tolerance strips of the prior art because the tapered portions does not fully extend downwardly to the same axis as the troughs. As mentioned above, the tapered portions are used to control the amount of compliance in the strip.

The reduction in the height of the corrugations at the ends provided a lead-in portion, facilitating assembly of the tolerance strip between adjacent components.

In addition, the reduction in the height of the corrugations at the ends, i.e. the tapered portions provide the tolerance strip with longitudinal rigidity, such that during compression the longitudinal expansion of the tolerance strip is controlled.

According to a preferred embodiment of the invention, the crests and troughs of the corrugations have a substantially flat longitudinally extending surface, so that contact pressure with the components between which the tolerance strip is located, will be spread over an elongate area when the corrugations are compressed.

The enhanced resilience of the tolerance strip of the present invention make it suitable for applications which experience high levels of differential expansion. Moreover in view of the lower loads that will be applied upon compression of the tolerance strip and the spreading of these loads, the tolerance strip of the present invention will make it suitable for use with components formed of brittle material.

The invention will now be described, by way of example only, with reference to the accompanying drawings, in which.

Figure 1:
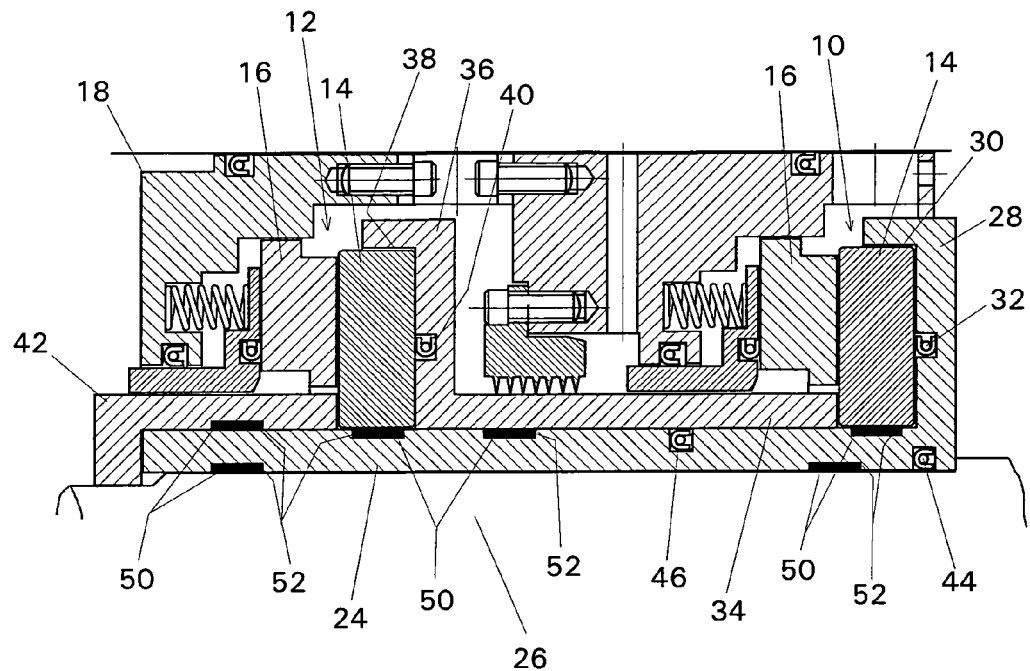
FIG. 1 is a cross sectional side elevation of a mechanical face seal incorporating tolerance strips in accordance with the present invention.

FIG. 1 illustrates a typical gas seal having two seal interfaces, an inboard seal interface 10 and an outboard seal interface 12. Each seal interface 10, 12 comprises a mating ring 14 and a primary ring 16. The primary rings 16 are slidably mounted and sealed with respect to a housing assembly 18, in known manner. The primary rings 16 are fixed rotationally with respect to the housing assembly 18 and are resiliently urged towards the mating rings 14.

The mating rings 14 are located in fixed axial and rotational relationship on a shaft 20 by means of a sleeve assembly 22. The sleeve assembly 22 has an inner sleeve 24 that is a sliding fit over the shaft 20 and is located axially of the shaft 20 against a shoulder 26. The inner sleeve member 24 has an outwardly extending flange formation 28 at its inboard end, the out board face of the flange formation 28 defining an annular recess 30. The mating ring 14 of the inboard seal interface 10 is a sliding fit on the inner sleeve member 24 and locates in the annular recess 30. A secondary sealing element 32 provides a fluid tight seal between the mating ring 14 and flange formation 28.

A first outer sleeve member 34 is slidingly located on the inner sleeve member 24, the inboard end of outer sleeve member 34 abutting the outboard face of the mating ring 14 of the inboard seal interface 10, to clamp the mating ring 14 against the flange formation 28 and locate it axially of the shaft 20.

The out board end of outer sleeve member 34 has an outwardly extending flange formation 36, the outboard face of the flange formation 36 defining an annular recess 38. The mating ring 14 of the outboard seal interface 12 is a sliding fit on the inner sleeve 24 and locates in the recess 38 and is sealed with respect to flange formation 36 be secondary seal 40. A second outer sleeve member 42 is a sliding fit over the inner sleeve 24 the inboard end of sleeve member 42 abutting the outboard mating ring 14 to clamp it against flange formation 36. Clamping means (not shown) abuts the outboard end of the second outer sleeve member 42 to clamp the sleeve assembly 22 axially of the shaft 20 against the shoulder 26. Secondary sealing elements 44, 46, are provided between the inner sleeve member 24 and shaft 20 and between the inner sleeve member 24 and first outer sleeve member 34.

In order to accommodate any tolerance variations in the external diameter of the shaft 20, the internal and external diameters of the inner sleeve member 24 and the internal diameters of outer sleeve members 34 and 42 and mating rings 14, and to accommodate any differential expansion of the components, to ensure centring of the components, tolerance strips 50 are located between, the shaft 20 and the inner sleeve 24 and between the inner sleeve 24 and the mating rings 14 and outer sleeves 34 and 42. The tolerance strips 50 are located in circumferential grooves 52 formed in one of each pair of components between which the tolerance strip 50 is located.

Figure 2:
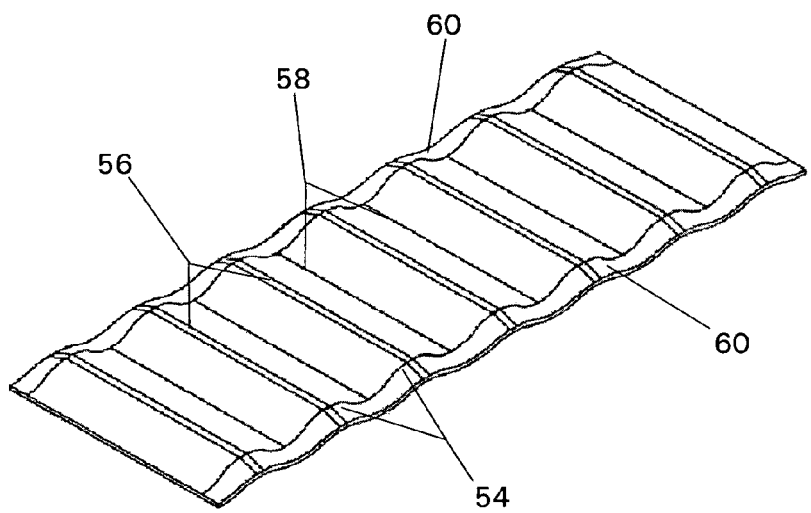
FIG. 2 is a perspective view of a length of tolerance strip in accordance with the present invention.
Figure 3:
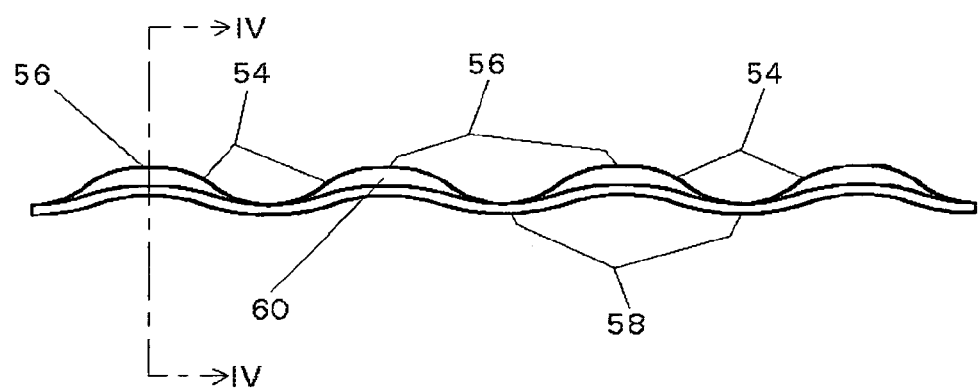
FIG. 3 is a side elevation of the tolerance strip shown in FIG. 2.
Figure 4:
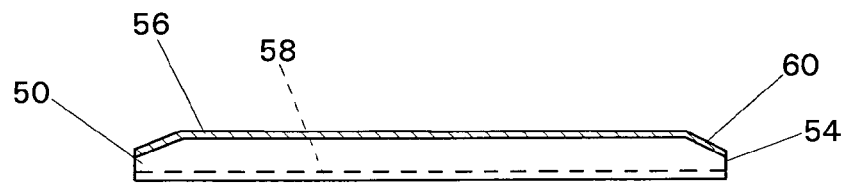
FIG. 4 is a section along the line IV-IV of FIG. 3.

As illustrated in greater detail in FIGS. 2 to 4 the tolerance strip 50 comprises a length of resilient strip of a metallic or alloy material, for example stainless steel. The strip 50 is formed with transverse corrugations 54 that extend across the full width of the strip 50, the corrugations 54 defining transversely extending crests 56 with transversely extending troughs 58 between adjacent corrugations. The corrugations 54 have a central portion, the height if which is substantially uniform across the width of the strip 50. End portions of the corrugations decrease in height towards the longitudinal edges of the strip 50 to form a tapered portion 60. The height of tapered portions 60 at the ends of each corrugation 54 are intermediate of the heights of the central portions of the crests 56 and the troughs 58. The crests 56 and troughs 58 are substantially flat longitudinally of the strip 50.

The overall thickness of the strip 50, from the outer surface of the troughs 58 to the outer surface of the crests 56 is designed such the when located in a circumferential groove 52 in one of a pair of opposed surfaces, it will be partially compressed between the surfaces at maximum tolerance and maximum differential expansion, for a particular application.

The width of the groove 52 is a tolerance fit with the width of the strip 50, the length of the strip 50 being sufficiently shorter that the circumference of the surfaces of the components, to permit longitudinal expansion of the strip 50, when the corrugations are depressed between the opposed surfaces.

In addition, the tapered portions 60 provide the tolerance strip 50 with longitudinal rigidity, such that during compression the longitudinal expansion of the tolerance strip 50 is controlled and the ends of the tolerance strip 50 are prevented from overlapping each other in the circumferential groove 52.

The strip 50 is located in the circumferential groove 52 of one component, the adjacent components are then assembled together, the tapered portions 60 of the corrugations providing a lead in portion, so that as the components are assembled, the corrugations 54 will be resiliently compressed between the opposed surfaces of the components. The leading edges of the components that will engage the strip 50 are also preferably radiused in order to facilitate assembly.

The resilient compression of the corrugations 54 will take up any tolerance variations in the opposed surfaces of the components and also be compressed and expand with differential thermal expansion of the components, to ensure that the components remain centred over the operating conditions of the assembly.

The flat surfaces of the crests 56 and troughs 58, which bear against the opposed surfaces of the components, will spread the loads over relative large areas. The tolerance strip 50 can consequently be used with components, for example mating rings 14, made of brittle materials, for example ceramics.

The tolerance strip 50 may be formed by a pressing process, for example between a pair of rollers. Because the material of the strip 50 does not yield as much, as compared to tolerance strips formed hitherto, work hardening is minimised and the resilience of the material is maintained. As a consequence the loads required to compress the convolutions will also be reduced.

The strip 50 does not yield as much because the tapered portions 60 do not fully extend downwardly to the same axis as the troughs 58.

While in the above embodiment, the crests 56 and troughs 58 have longitudinally extending flattened surfaces to spread the compressive loads, only the surface that will bear against the brittle component need be flattened. Alternatively, where the tolerance strip is to be used with components made of strong material, the crests and troughs may be formed as a continuous curve.

While the tolerance strip of the present invention, as described above, is formed by pressing, the strip may alternatively be formed by moulding.

The invention claimed is:

1. A tolerance strip comprising a strip of resilient material formed with corrugations, the corrugations extending transversely across the full width of the strip, the corrugations defining crests with troughs between adjacent crests, a central portion of the corrugations being of substantially uniform height across the strip, portions of the corrugations adjacent each longitudinal edge of the strip define tapered portions extending from said central portion decreasing in height to the edge of the strip, whereby the height of the crests at the edges of the strip are intermediate of the height of the crests in the central portion of the strip and the troughs, and said edges of said strip define a sinusoidal shape.

2. A tolerance strip according to claim 1 in which the troughs and/or crests of the corrugations are flat longitudinally of the strip.

3. A tolerance strip according to claim 2 in which the strip is formed from a metallic or alloy material.

4. A tolerance strip according to claim 1 in which the strip is formed from a metallic or alloy material.

5. A method of making a tolerance strip comprising a strip of resilient material formed with corrugations, the corrugations extending transversely across the full width of the strip, the corrugations defining crests with troughs between adjacent crests, a central portion of the corrugations being of substantially uniform height across the strip, portions of the corrugations adjacent each longitudinal edge of the strip decreasing in height to the edge of the strip, the method comprising:

providing a strip;

forming corrugations in said strip having a central portion and tapered portions extending from said central portion to said edges with the edge tapered portions decreasing in height to the edges of the strip, whereby the height of the crests at the edges of the strip are intermediate of the height of the crests in the central portion of the strip and the troughs and the edges define a sinusoidal shape, by the process selected from the group comprising pressing or moulding.

6. A method of making a tolerance strip according to claim 5 in which said strip is pressed between shaped rollers.

7. A method of making a tolerance strip as claimed in claim 6 wherein said method indicates forming said troughs and/or crests of said corrugations to be flat longitudinally of said strip.

8. A method of making a tolerance strip as claimed in claim 5 in which said strip is formed by moulding.

9. A method of making a tolerance strip as claimed in claim 8 wherein said method indicates forming said troughs and/or crests of said corrugations to be flat longitudinally of said strip.

10. A method of making a tolerance strip as claimed in claim 5 wherein said method indicates forming said troughs and/or crests of said corrugations to be flat longitudinally of said strip.

* * * * *

UNITED STATES PATENT AND TRADEMARK OFFICE
CERTIFICATE OF CORRECTION

PATENT NO. : 8,715,835 B2
APPLICATION NO. : 13/202514
DATED : May 6, 2014
INVENTOR(S) : Christian Kirchner et al.

Page 1 of 1

It is certified that error appears in the above-identified patent and that said Letters Patent is hereby corrected as shown below:

In the Claims

Column 5, line 3 (claim 5, line 13) after "with the", delete "edge"

Signed and Sealed this
Twenty-second Day of July, 2014

Michelle K. Lee
*Deputy Director of the United States Patent and Trademark Office*